United States Patent [19]

Harris

[11] 4,336,961
[45] Jun. 29, 1982

[54] LATCH FOR A CASSETTE

[75] Inventor: Clark E. Harris, Fairport, N.Y.

[73] Assignee: Eastman Kodak Company, Rochester, N.Y.

[21] Appl. No.: 152,871

[22] Filed: May 23, 1980

[51] Int. Cl.³ .............................................. E05C 3/30
[52] U.S. Cl. ................................................. 292/254
[58] Field of Search ........................... 292/254, 80, 85

[56] References Cited

U.S. PATENT DOCUMENTS

| | | | |
|---|---|---|---|
| 1,587,497 | 6/1926 | Avdo | 292/254 X |
| 2,660,765 | 12/1953 | Carlson | 292/254 X |
| 2,735,740 | 2/1956 | Soans | 292/254 X |
| 3,540,578 | 11/1970 | Jones | 292/254 X |

Primary Examiner—Richard E. Moore
Attorney, Agent, or Firm—D. M. Woods

[57] ABSTRACT

A latch operating lever is mounted on one panel of a cassette or the like. The latch lever has a hook portion at one end captured between a lid on the panel and a latch plate secured to and spaced from the lid. The latch plate has a hinge bar over which the hook portion is mounted, and an opening below the hinge bar through which the free end of the hook portion extends. The latch plate engages a catch spring on another panel for releasably latching the panels together. Pivotal movement of the latch operating lever causes the free end of the hook portion to engage the catch spring and disengage it from the latch plate for releasing the panels.

4 Claims, 7 Drawing Figures

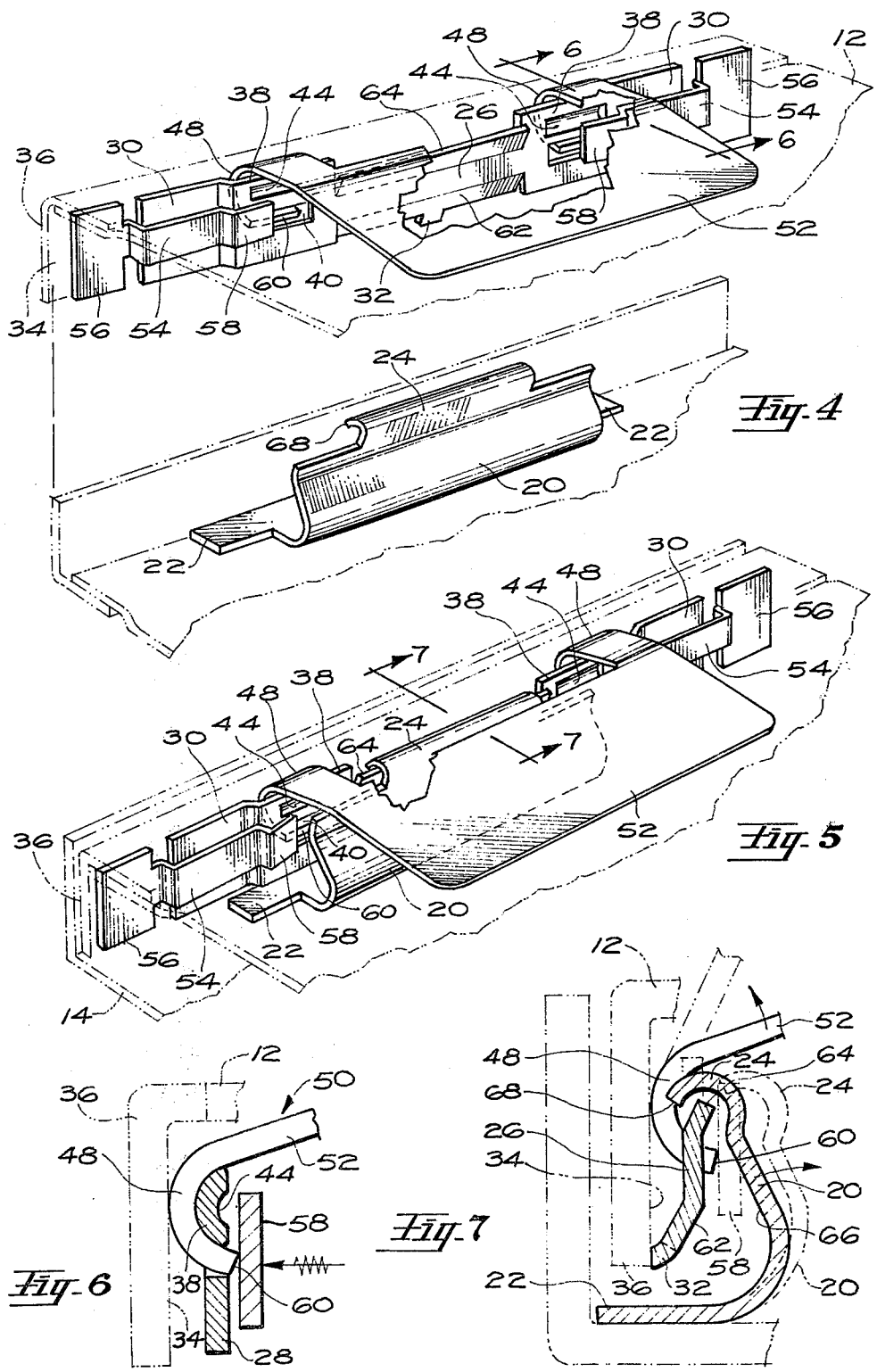

4,336,961

LATCH FOR A CASSETTE

BACKGROUND OF THE INVENTION

1. Field of the Invention

The present invention relates generally to latches, and more particularly to an improved latch for a cassette such as an X-ray film cassette or the like.

2. Description of the Prior Art

The prior art is replete with latches for X-ray film cassettes of which U.S. Pat. Nos. 3,153,145 and 3,323,676 are exemplary.

U.S. Pat. No. 3,153,145 discloses a latch for a cassette having a latch plate on one panel and a catch spring on the other panel. When the plate and spring are moved into engagement, they releasably latch the panels together. The latch further has a pivotal latch operating lever mounted on one panel. Pivotal movement of the latch operating lever causes the free end of the lever to engage the catch spring and disengage it from the latch plate for releasing the panels. The pivot means for the latch operating lever comprises a pivot shaft on the panel, and depending side flanges on the lever through which the shaft is journaled for relative rotational movement.

U.S. Pat. No. 3,323,676 discloses a cassette latch having a latch operating lever pivotally mounted on a shaft supported by one panel. The latch operating lever has two parts welded together to form an opening therebetween for receiving the shaft. The lever further has a handle at one end, and a rigid hook at the other end biased into engagement with a rigid catch member on the other panel for releasably latching the panels together.

A commercially available X-ray film cassette known in the art comprises a latch operating lever mounted on one of the panels for pivotal movement about a rigid shaft secured to the panel. The latch operating lever has a pair of lugs movable therewith into engagement with an L-shaped catch plate, also pivotally mounted to the shaft. The lugs retract the catch plate from a latch plate on the other panel for releasing the two panels. A pair of helical springs are mounted on the shaft, one interposed between the latch operating lever and panel and the other interposed between the catch plate and panel for normally urging the latch operating lever and catch plate into normal and latched positions respectively.

A problem with the latches disclosed in the prior art is that the pivot means comprising shafts and shaft supports such as flanges, are subjected, due to the geometry of the latches, to considerable forces and stresses with repeated use of the latches. Such forces in time will cause the shaft and flanges of the latches to wear and eventually to fail. When this occurs, the cassette has to be rebuilt, if possible, or discarded, both options of which are costly.

Other problems with the prior art latches are their unreliability, complexity, and high cost of manufacture, due primarily to the number of high precision latch parts involved, and the time consuming manufacturing operations required to assemble and produce the latches.

SUMMARY OF THE INVENTION

In accordance with a preferred embodiment of the invention, a latch for releasably latching panels of a cassette, such as an X-ray cassette or the like, has a catch member mounted on one of the panels. Latch means for latching the catch member is mounted on the other panel. The latch means has a latch portion positioned to normally engage and latch the catch member when the panels are closed for releasably holding them in a closed position. The latch means also has a hinge bar partially encircled by a hook portion at one end of a latch operating lever. The hook portion has an actuating part thereof positioned adjacent the catch member in a normal position of the latch operating lever. Means are provided on the one panel for retaining the hook portion onto the hinge bar. When the latch operating lever is moved by a handle at its opposite end from its normal position in engagement with the panel to a latch release position, the hook portion pivots on the hinge bar causing the actuating part of the hook portion to engage the catch member and disengage it from the latch portion allowing the panels to be opened.

In other aspects of the invention, the catch member comprises a spring plate having one edge secured to one panel, and a curved free edge for engaging the latch portion. The actuating part of the hook portion for engaging the catch member comprises the free end of the hook portion. A leaf spring is provided for biasing the latch operating lever into its normal position in engagement with the panel.

In a more specific aspect of the invention, the latch means comprises a latch plate mounted on a lip portion of the panel with a section of the latch plate parallel to and spaced from the lip portion. The plate section has a pair of spaced hinge bars between which the latch portion is interposed. Each hinge bar has an opening adjacent thereto through which the free actuating end of a complementary hook portion extends for engaging the catch member. A leaf spring engages a portion of each of the free ends for biasing the latch operating lever into its normal position in engagement with the panel.

The primary advantage of this invention in all of its aspects is to provide an improved latch for cassettes such as X-ray film cassettes or the like. The improved latch is ruggedly built and reliable, yet of simple design and construction, and exhibits insignificant wear and failure following repeated use. Consequently, the life of the cassettes is greatly increased, and the cost of manufacture and maintenance of the cassettes is decreased.

The invention and its advantages will become more apparent from the detailed description of the invention presented below.

BRIEF DESCRIPTION OF THE DRAWINGS

In the detailed description of the invention presented below, reference is made to the accompanying drawings, in which:

FIG. 1 is a fragmentary view in perspective of a cassette in which an improved latch in accordance with this invention is incorporated, and illustrated in its normal unlatched position;

FIG. 2 is a view similar to FIG. 1 showing the latch in its normal latched position;

FIG. 3 is an exploded view in perspective of the latch with portions of the cassette illustrated in phantom;

FIG. 4 is a perspective view of the assembled latch in its normal unlatched position with portions of the cassette open and illustrated in phantom;

FIG. 5 is a view similar to FIG. 4 showing the cassette closed and the latch in its normally latched position;

FIG. 6 is a section view taken substantially along line 6—6 of FIG. 4; and

FIG. 7 is a section view taken substantially along line 7—7 of FIG. 5 showing the latch in its normal latched position in full lines, and in its latch release position in broken lines.

DETAILED DESCRIPTION OF THE INVENTION

Referring now to FIGS. 1 and 2 of the drawings, a preferred embodiment of the improved latch of this invention is incorporated in an X-ray film cassette indicated generally at 10, only a portion of which is shown. Film cassette 10 is of a known type having upper and lower curved spring panels 12, 14 respectively hinged at one end, not shown. When upper and lower latch parts indicated generally at 16, 18 respectively are released, upper and lower panels 12, 14 respectively are forced apart due to their resilience into the partially open position illustrated in FIG. 1. When the panels are forced together, the upper and lower latch parts become engaged for releasably latching the cassette panels together in a closed position as shown in FIG. 2.

With reference to FIGS. 3-6, lower latch part 18 comprises a flexible spring catch member 20. Catch member 20 has a base 22 secured to the upper surface of lower panel 14 by any suitable means such as spot welding, rivets or the like. The free end portion 24 of catch member 20 is curved for latching onto a latch portion 26 of upper latch parts 16.

Upper latch parts 16 comprise a latch plate 28 having ends 30 and a central lower edge 32 (FIGS. 3 and 7) secured by any suitable means such as spot welding or the like to the inner surface 34 of a lip 36 depending from the free end of upper panel 12. The remaining section of latch plate is spaced from inner surface 34, and has a pair of spaced hinge bars 38 between which latch portion 26 is located. A pair of rectangularly shaped openings 40 extend through latch plate 28. Each hinge bar 38 is formed by the part of plate 28 between each opening 40 and upper edge surface 42 of latch plate 28. As best seen in FIGS. 3 and 6, each hinge bar 38 is provided with an elongated indentation 44 on its outer surface formed by a punching operation or the like. This causes inner surface 46 to be curved for slidably receiving a complementary one of a pair of hook portions 48 along one end of a latch operating lever 50. Hook portions 48 are captured between inner surfaces 46 of hinge bars 38 and inner surface 34 of lip 36 (see FIG. 7). The opposite end of latch operating lever 50 forms a handle 52 by which the latch operating lever may be pivoted about hinge bars 38 for releasing the latch. A pair of leaf springs 54 are provided wherein each spring has one end 56 secured to the inner surface 34 of lip 36 by spot welding or the like. The opposite free end 58 of each spring 54 engages the actuating end surface 60 of each hook portion 48 for biasing latch operating lever 50 onto its normal position, as best seen in FIGS. 4 and 5. In this position, handle 52 is forced against the upper surface of a depression in panel 12 as best seen in FIGS. 1 and 2.

The operation of the latch parts 16, 18 will now be described with particular reference to FIG. 7. To latch the upper and lower panels 12, 14 respectively together, the upper panel is pressed toward the lower panel causing an outer cam surface 62 on latch portion 26 to engage end 24 of catch member 20 and to flex it outwardly substantially to the broken line position seen in FIG. 7. When the end of cam surface 62 is reached at the upper edge surface 64 of latch portion 26, catch member 20 is released and returns to its original full line position seen in FIG. 7. In this position, its curved end 24 catches latch portion 26 for releasably latching the upper and lower panels together in a closed position.

To release upper and lower panels 12, 14 respectively of cassette 10, the operator grasps handle 52 of latch operating lever 50 and pivots the lever from its normal position to its latch release position seen in broken lines in FIG. 7. During this movement, actuating end surfaces 60 of hook portions 48 engage the inner surface 66 of catch member 20, and force it into the broken line unlatched position seen in FIG. 7. In this position, the free end surface 68 of catch member is clear of the upper edge surface 64 of latch portion 26, and the upper and lower panels 12, 14 respectively may be separated into an open position. Such separation occurs automatically in cassettes 10 of the type illustrated herein where the panels are curved outwardly away from one another in their normal position, and are placed under tension when moved into the latched position.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A latch for a cassette having a bottom panel, and a cover panel having a depending lip portion, the bottom and cover panels being movable between open and closed positions, comprising:
    a catch member mounted on the cassette bottom panel;
    a latch plate positioned parallel to and spaced from the lip portion of the cover panel and having a latch portion disposed such that its upper edge surface engages said catch member in the closed position of the cover panel to lock the cover panel in its closed position;
    said latch plate further having an opening extending therethrough with the portion of said latch plate between said opening and said upper edge surface defining a hinge bar adjacent said opening; and
    a latch operating lever pivotally mounted and solely supported between said hinge bar and said lip portion; said lever having an actuating part and being pivotal about said hinge bar to cause said actuating part to extend through said opening to engage said catch member and disengage it from said latch plate to unlock the cover panel.

2. A latch according to claim 1, and further comprising spring means mounted on said latch plate for engaging said actuating part of said lever to inhibit pivotal movement of said lever.

3. A latch according to claim 1 wherein said latch plate has a pair of spaced hinge bars, each having an opening adjacent thereto, and said latch portion is interposed between said hinge bars, said lever has a pair of spaced curved hook portions at one end thereof pivotal about complementary hinge bars, and said actuating part of said lever comprises the free end surfaces of said hook portions extending through said complementary openings.

4. A latch for releasably latching top and bottom panels of a cassette or the like into a closed position comprising:
- a catch member mounted on one of said top and bottom panels;
- latch means mounted on the other of said top and bottom panels for latching said catch member, said latch means having a hinge bar and a latch portion, said latch portion being positioned to normally engage said catch member when said top and bottom panels are closed for releasably latching said top and bottom panels in a closed position;
- a movable latch operating lever having a handle at one end and a hook portion at its opposite end partially encircling said hinge bar, said hook portion having an actuating part positioned adjacent said catch member;
- spring means for biasing said latch operating lever into a normal position, said spring means comprising a leaf spring having one end mounted on said one of said top and bottom panels, and its free end bearing against said actuating part of said hook portion; and
- means for retaining said hook portion onto said hinge bar whereby when said latch operating lever is moved by said handle from said normal position to a latch release position, said hook portion pivots on said hinge bar causing said actuating part to engage said catch member and disengage it from said latch portion whereby said top and bottom panels are unlatched for movement to an open position.

* * * * *